April 22, 1924.

G. C. THOMAS, JR

FITTING FOR ELECTRICAL CONDUITS, OUTLET BOXES, AND THE LIKE

Filed Aug. 19, 1922

1,491,325

Inventor
George C. Thomas, Jr.
J. T. Edwards
Attorney

Patented Apr. 22, 1924.

1,491,325

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

FITTING FOR ELECTRICAL CONDUITS, OUTLET BOXES, AND THE LIKE.

Application filed August 19, 1922. Serial No. 583,025.

*To all whom it may concern:*

Be it known that I, GEORGE C. THOMAS, Jr., a citizen of the United States, residing at Elizabeth, in the county of Union and State of New Jersey, have invented certain new and useful Improvements in Fittings for Electrical Conduits, Outlet Boxes, and the like, of which the following is a specification.

My invention relates to fittings adapted to be removably associated with an opening, such as an opening at the end of an electrical conduit, or the usual opening of an outlet box, or the like, and serving in the manner of a knockout to close the opening when no connector or cable is therein.

The principal aim of my invention is to provide a simple, durable, and inexpensive closure fitting so designed that it may easily and readily be secured in or be removed from covering position over an opening of an electrical conduit, outlet box, or the like. Other objects of my invention will be in part obvious and in part pointed out hereinafter.

In accordance with my invention, the fitting consists of a pliable body carrying projecting shoulders or flanges which approach toward each other as the fitting is collapsed along a diametric line extending between the projections, and which move apart when the fitting is straightened out. The fitting is large enough to cover the opening, having a peripheral portion which overlaps the wall about the opening. By collapsing the fitting until the shoulders are close enough together to be projected into the opening, and when so projected, by straightening out the fitting, the shoulders are forced radially into binding engagement against or behind the wall at the opening, and the fitting is secured in place. Since the fitting is pliable, it may readily be distorted to bring the shoulders out of binding engagement with the wall to permit the removal of the fitting therefrom, yet until it is so distorted it maintains itself securely and firmly in covering position over the opening.

In order that my invention may be more clearly understood, attention is hereby directed to the accompanying drawings forming part of this application and illustrating one possible embodiment of my invention.

Figure 1:
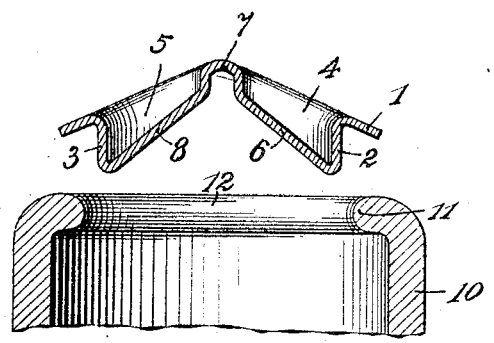
Figure 3:
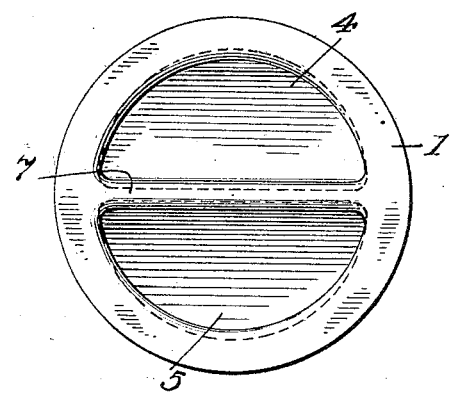
Figure 2:
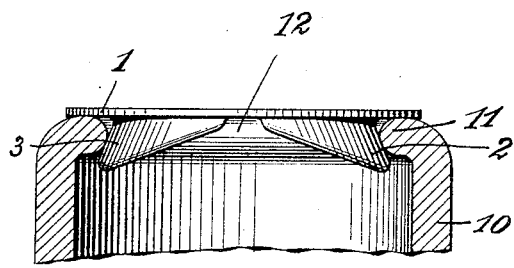
Figure 4:
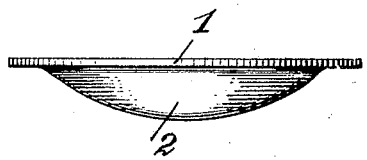

In the drawings, Fig. 1 is a sectional end view of a fitting embodying my invention, shaped for insertion into an opening at the end of an electrical conduit; Fig. 2 is an end view of the fitting shown secured in covering position at the end of an electrical conduit, the conduit being shown in section; Fig. 3 is a top plan view of the fitting, and Fig. 4 is a side elevation of the fitting in extended position. Similar reference characters refer to similar parts throughout the several views of the drawings.

Referring to the drawings, my fitting, in one of the preferred forms, consists of a stamping of sheet metal large enough to cover an opening of an outlet box, electrical conduit, or the like. The stamping is formed to present an annular peripheral rim portion 1, which is diametrically larger than the diameter of the opening which is to be closed, and two diametrically opposite projecting shoulders, or flanges, 2 and 3, which extend at an acute angle from the inner edge of the rim 1. Shoulders 2 and 3 are produced by forming depressions 4 and 5 by a stamping operation. The bottom 6 of depression 4 tapers upwardly from the bottom of shoulder 2 to a diametrical rib 7. Bottom 8 of the depression 5 tapers up from the bottom of flange 3 to the rib 7 on the opposite side. This fitting is made preferably of material which is pliable, and not resilient, so that, when desired, it may be flexed diametrically along the rib 7 into the angular shape shown in Fig. 1, and then, when desired, may be flexed back to its normal or flat position shown in Fig. 2. As the fitting is flexed along the line of rib 7 into angular shape, portions 2 and 3 move toward each other, and as the fitting is restored to flat or normal shape these shoulers move apart.

The drawings illustrate the manner of applying the fitting to the end of an electrical conduit 10 which has the usual bushing 11 at its end opening 12. To mount the fitting it is first flexed diametrically along the rib 7 until the shoulders 2 and 3 are positioned so close together that they may be projected into the opening 12 which it is desired to cover. (See Fig. 1.) These shoulders 2 and 3 are then inserted into the opening until rim 1 encounters the wall about the opening. The fitting is then flexed back toward normal shape. This may be done by exerting inward pressure upon the rib 7, and the flattening out of the fitting causes the shoulders 2 and 3 to move radially away from each other and to come into binding engagement against the bushing 11 about the opening, with the ends of the shoulders seated behind the bushing (see Fig. 2). The fitting thus holds itself securely in place and completely covers the opening. In order to remove a positioned fitting from an opening, the fitting is collapsed sufficiently, as by applying and moving a screw driver or other instrument between the fitting and the wall, to move the portions 2 and 3 sufficiently close together to permit of their withdrawal through the opening, whereupon the fitting will either drop from the opening of itself, or it may readily and easily be picked away. The fitting may also be removed, if desired, by grasping the rib 7 with a pair of pincers and pulling thereon, this operation causing sufficient distortion of the fitting to permit of its removal in this manner.

In the form shown, the shoulders 2 and 3 are laterally semi-circular and their angular relation to rim portions which they join is constant. However, these shoulders or flanges may assume other form or shape, and their number may be increased if desired. When the fitting is applied to an opening in an outlet box the shoulders may be arranged to bind behind the wall at the opening. When the fitting is applied to a conduit opening which lacks a bushing, the shoulders bind against the interior wall of the conduit and hold the fitting in place by their frictional engagement therewith. Obviously, the fitting may be modified in many ways without departing from the scope of my invention, and therefore it is to be understood that my invention is not strictly limited to the exact details of construction described, but is as broad as is indicated by the claim which follows.

What I claim is:—

A closure of the character described, consisting of an integral, imperforate piece of pliable sheet metal having a straight narrow diametrical portion across its upper surface, a rim portion, portions, one on each side of said narrow diametrical portion, inclining from said narrow diametrical portion in a direction at right angles thereto, and flanges extending from the outer edges of said inclined portions to the inner edges of said rim portion at an acute angle to said rim portions, said closure being pliably collapsible and extensible from said narrow diametrical portion into different self-sustaining positions, whereby said flanges may be moved and placed different distances apart.

This specification signed this 16 day of August, 1922.

GEORGE C. THOMAS, Jr.